US012537306B2

(12) United States Patent
So et al.

(10) Patent No.: US 12,537,306 B2

(45) Date of Patent: Jan. 27, 2026

(54) ANTENNA ASSEMBLY AND MANUFACTURING METHOD THEREFOR

(71) Applicant: KMW INC., Hwaseong-si (KR)

(72) Inventors: Sung Hwan So, Hwaseong-si (KR); Seong Man Kang, Hwaseong-si (KR); Oh Seog Choi, Hwaseong-si (KR); Hyoung Seok Yang, Hwaseong-si (KR); Yong Won Seo, Daejeon (KR)

(73) Assignee: KMW INC., Hwaseong-si (KR)

(*) Notice: Subject to any disclaimer, the term of this patent is extended or adjusted under 35 U.S.C. 154(b) by 214 days.

(21) Appl. No.: 18/099,916

(22) Filed: Jan. 20, 2023

(65) Prior Publication Data

US 2023/0163477 A1 May 25, 2023

Related U.S. Application Data

(63) Continuation of application No. PCT/KR2021/009457, filed on Jul. 22, 2021.

(30) Foreign Application Priority Data

Jul. 23, 2020 (KR) ........................ 10-2020-0091952
Jul. 21, 2021 (KR) ........................ 10-2021-0095745

(51) Int. Cl.
*H01Q 9/04* (2006.01)
*H01Q 1/52* (2006.01)
(Continued)

(52) U.S. Cl.
CPC ........... *H01Q 9/0435* (2013.01); *H01Q 1/523* (2013.01); *H01Q 21/0087* (2013.01); *H01Q 21/065* (2013.01)

(58) Field of Classification Search
CPC .. H01Q 9/0435; H01Q 1/523; H01Q 21/0087; H01Q 21/065; H01Q 9/045; H01Q 21/0075
See application file for complete search history.

(56) References Cited

U.S. PATENT DOCUMENTS

| | | | |
|---|---|---|---|
| 2007/0148996 | A1 | 6/2007 | Hildebrand et al. |
| 2017/0125919 | A1 | 5/2017 | Chien et al. |

(Continued)

FOREIGN PATENT DOCUMENTS

| | | | |
|---|---|---|---|
| CN | 111384600 | A | 7/2020 |
| JP | 2018-532344 | A | 11/2018 |

(Continued)

OTHER PUBLICATIONS

Hang Wong, Ka-Leung Lau and Kwai-Man Luk, "Design of dual-polarized L-probe patch antenna arrays with high isolation," in IEEE Transactions on Antennas and Propagation, vol. 52, No. 1, pp. 45-52, Jan. 2004, doi: 10.1109/TAP.2003.822402 (Year: 2004).*

(Continued)

*Primary Examiner* — Hai V Tran
*Assistant Examiner* — Austin M Back

(57) ABSTRACT

The present invention relates to an antenna assembly and a manufacturing method therefor, and particularly, comprises a base panel including: at least one radiation element made of a first metal material; and a fixing member which is made of the first metal material or a second metal material that differs from the first metal material, and which spaces the radiation element from one surface thereof, and thus the advantages of reduced manufacturing costs and manufacturing time are provided.

16 Claims, 12 Drawing Sheets

(51) Int. Cl.
*H01Q 21/00* (2006.01)
*H01Q 21/06* (2006.01)

(56) References Cited

U.S. PATENT DOCUMENTS

| | | | | |
|---|---|---|---|---|
| 2018/0090852 A1* | 3/2018 | Dufilie | H01Q 1/38 |
| 2018/0219277 A1* | 8/2018 | Hirata | H01Q 1/02 |
| 2018/0248256 A1* | 8/2018 | Xiao | H01Q 1/405 |
| 2018/0331428 A1* | 11/2018 | Iino | H01Q 5/35 |
| 2019/0123443 A1* | 4/2019 | Russell | H01Q 1/22 |
| 2022/0231401 A1* | 7/2022 | Taveniku | H01Q 1/1271 |

FOREIGN PATENT DOCUMENTS

| | | |
|---|---|---|
| KR | 10-0906351 B1 | 7/2009 |
| KR | 10-2019-0009689 A | 1/2019 |
| KR | 10-2019-0088682 A | 7/2019 |

OTHER PUBLICATIONS

International Search Report mailed Oct. 28, 2021 for International Application No. PCT/KR2021/009457 and its English translation.

Non-final Office Action mailed Aug. 21, 2022 from the Korean Intellectual Property Office for Korean Application No. 10-2021-0095745.

Notice of Allowance mailed Nov. 10, 2022 from the Korean Intellectual Property Office for Korean Application No. 10-2021-0095745.

Non-final Office Action mailed on Jan. 30, 2024 from the Japanese Patent Office for Japanese Application No. 2023-502673.

European Search Report for Application No. 21846809.8 dated Sep. 2, 2024.

XP-001046269, "Design of Dual-Polarized L-Probe Patch Antenna Arrays With High Isolation", IEEE Transactions on Antennas and Propagation, vol. 52, No. 1, Jan. 2004.

* cited by examiner

ANTENNA ASSEMBLY AND MANUFACTURING METHOD THEREFOR

CROSS-REFERENCE TO RELATED APPLICATIONS

This application is a continuation application of International Application No. PCT/KR2021/009457, filed Jul. 22, 2021, which claims the benefit of Korean Patent Application Nos. 10-2020-0091952, filed Jul. 23, 2020; and 10-2021-0095745, filed Jul. 21, 2021, in the Korean Intellectual Property Office, the disclosures of which are incorporated herein in their entirety by reference.

TECHNICAL FIELD

The present disclosure relates to an antenna assembly and a method of manufacturing the same, and more specifically, to an antenna assembly capable of automated assembly process in a shape in which many conventional components such as a reflector and a dielectric structure are deleted.

BACKGROUND ART

Base station antennas including repeaters used in mobile communication systems have various shapes and structures and generally have a structure in which a plurality of radiation elements are appropriately disposed on at least one reflector that stands upright in a longitudinal direction.

In recent years, research has been actively conducted to achieve a compact, lightweight, and low-cost structure while satisfying a high-performance demand for multiple input and multiple-output (MIMO)-based antennas, and in particular, antenna devices to which a patch-type radiation element for implementing linear polarization or circular polarization is applied commonly use a method of plating a radiation element formed as a dielectric board made of a plastic or ceramic material and coupling the radiation element to a printed circuit board (PCB) or the like through soldering.

The related art related to a representative base station antenna may include Korean Patent Application Laid-Open No. 10-2011-0054150 (published on May 25, 2011) previously filed by this applicant.

According to the patent publication, there is a problem that a relatively large amount of space required for installing the circuit board 111 and the feeding line on the rear surface of the reflector 1 are required in that the patch-type first radiation element 11 and the dipole-type second radiation element 21 are stacked on one surface of the reflector 1, and the circuit board 111 for the feeding to the first radiation element 11 and the feeding line (e.g., a feeding cable) disposed to pass through the circuit board 111 and for the feeding to the second radiation element 21 need to be provided on the other surface of the reflector 1.

In order to solve the problem, as disclosed in the Korean Patent No. 10-1609665 (published on Apr. 6, 2016), this applicant has constituted a plurality of first feeding lines 142 disposed between the reflector 1 and the first radiation element 14 in an X shape and for providing a feeding signal to the corresponding patch plate 140 and has also constituted the second feeding line connected to the second radiation element 13 in the feeding cable structure or the signal coupling strip line structure extending from the reflector 1, but there is a problem that even with the structure, the signal coupling strip lines forming the first feeding line 142 needs to be installed to maintain the relative high position on the reflector 1 so that the corresponding coupling signal transmission portion has the appropriate separation distance with the patch plate 140 in order to provide the feeding signal to the patch plate 140 in the coupling type, while the support having the appropriate shape made of the synthetic material such as Teflon (dielectric) needs to be reinforced to stably support and fix the installed state of the plurality of signal coupling strip lines.

In addition, the related art adopts the assembly method of stacking and coupling the reflector 1 to one surface of the antenna board (not shown), then arranging the circuit board related to the first feeding line 142 in the X shape, and then manually stacking the first radiation elements 14, which are manufactured in the method of plating the outer surface of the patch plate made of the plastic material, and connecting the first radiation elements 14 to the feeding signal connection portion in the solder method using the previously applied solder cream, but not only an increase in the cost and a complicated manufacturing process but also the non-uniformity problem between the soldering points due to many soldering points are the main cause of the antenna defects.

DISCLOSURE

Technical Problem

The present disclosure has been made in efforts to solve the problems and is directed to providing an antenna assembly and a method of manufacturing the same capable of constructing an automated assembly process.

In addition, the present disclosure is directed to providing an antenna assembly and a method of manufacturing the same capable of easily automatizing an assembly line because a radiation element and a base panel may be made of a first material or a second material through a die-casting mold or a press mold and then assembled to a signal coupling strip line in a laser point welding method without separate plating process.

In addition, the present disclosure is directed to providing an antenna assembly and a method of manufacturing the same having a high gain because a plurality of signal coupling strip lines disposed in series with respect to each feeding point of a radiation element may be connected.

The objects of the present disclosure are not limited to the above-described objects, and other objects that are not mentioned will be able to be clearly understood by those skilled in the art from the following description.

Technical Solution

An antenna assembly according to one embodiment of the present disclosure includes at least one radiation element made of a first metal material, a base panel made of the first metal material or a second metal material different from the first metal material and including a fixing member configured to separate the radiation element from one surface thereof, and at least one signal coupling strip line disposed on the other surface of the base panel and connected to the radiation element by passing through the base panel to provide a feeding signal to the radiation element.

Here, the radiation element and the base panel may be formed as an electrical ground as a whole for the feeding to the radiation element.

In addition, the base panel may further include at least one cavity wall formed to minimize signal interference between adjacent radiation elements.

In addition, each of the radiation element and the base panel may be manufactured by a die-casting mold or a press mold.

In addition, the first material of the radiation element may include a metal material or plastic having a metal-plated surface.

In addition, the second material of the base panel may include an aluminum material or a magnesium material.

In addition, the radiation element may be formed in a disk or polygonal shape.

In addition, the signal coupling strip line may include a strip line main body formed in a linear shape to correspond to a straight line connecting any one of feeding points of the radiation element disposed side by side and a plurality of through terminals branched and extending from the strip line main body and connected to any one of the feeding points of the radiation element.

In addition, the plurality of through terminals may be connected by passing through the radiation element or connected to a plurality of extension connection legs formed to extend from the radiation element toward a bottom surface of the base panel.

In addition, the radiation element may be provided with a laser transmission cutout portion in which a portion of an edge is formed to be cut for the laser point welding connection with the plurality of through terminals through the plurality of extension connection legs.

In addition, feeding connection holes into which the plurality of through terminals are inserted may be formed by passing through ends of the plurality of extension connection legs, and the plurality of extension connection legs may extend so that the ends in which the feeding connection holes are formed are positioned just under the laser transmission cutout portion.

In addition, the fixing member may be formed to protrude from a center of a bottom surface on which the cavity wall is each formed, and each of fixing member through holes through which an upper attached portion of the fixing member to which the radiation element is attached passes may be formed in the radiation element.

In addition, the radiation element and the signal coupling strip line, and the radiation element and the fixing member may be connected by a laser point welding coupling method.

In addition, the radiation element may be provided as a dual polarization patch element for generating any one dual polarization of ±45° polarization or vertical/horizontal polarization, and the signal coupling strip line may be provided in a linear shape that is simultaneously connected to any one of feeding points of the radiation element disposed side by side.

In addition, the feeding signal may be simultaneously supplied through a pair of signal coupling strip lines disposed adjacent to each other among the signal coupling strip lines, and the feeding signal may be supplied in parallel to a center point of the radiation elements disposed side by side, and then the feeding signals may be branched in a one side linear direction and the other side linear direction and each supplied serially.

In addition, the other surface of the base panel may be formed integrally with a plurality of ground accommodating ribs for accommodating partitioned signal coupling strip lines, respectively, after partitioning the plurality of signal coupling strip lines.

A method of manufacturing an antenna assembly according to the present disclosure includes a radiation element manufacturing operation of mold-manufacturing a radiation element by a die-casting method or a press method using a molding material of a first metal material, a base panel manufacturing operation of mold-manufacturing a base panel in the die-casting method or the press method using a molding material of a material that is the same as the first metal material or different from the first metal material, and a fixing operation of coupling a signal coupling strip line provided to pass through the base panel and the radiation element for the base panel in a laser point welding method using a laser welding device.

Here, the radiation element manufacturing operation may be implemented so that a laser transmission cutout portion for the coupling with the radiation element in the laser point welding method is formed when a pair of extension connection legs extending a predetermined length from one surface of the radiation element is further provided.

Advantageous Effects

According to one embodiment of the antenna assembly and the method of manufacturing the same according to the present disclosure, the following various effects can be achieved.

First, since the radiation material and the base panel are made of the metal material through the die-casting method or the press method, it is possible to omit the configuration of the printed circuit board (PCB), the feeding cable, and the reflector as compared to the related art, thereby saving the cost.

Second, as compared to the related art in which the radiation material is made of the plastic or ceramic material, it is possible to not only delete the solder process using the application of the solder cream but also delete the separate plating process, thereby not requiring the uniform soldering design in the solder process. Therefore, it is possible to greatly reduce the cost required for the plating process as well as reducing the number of assembly operations.

Third, it is possible to easily automatize the assembly process by deleting the solder process manually performed, thereby securing the accuracy of the assembly as well as shortening the manufacturing time.

The effects of the present disclosure are not limited to the above-described effects, and other effects that are not mentioned will be able to be clearly understood by those skilled in the art from the description of the claims.

MODE FOR INVENTION

Figure 1:
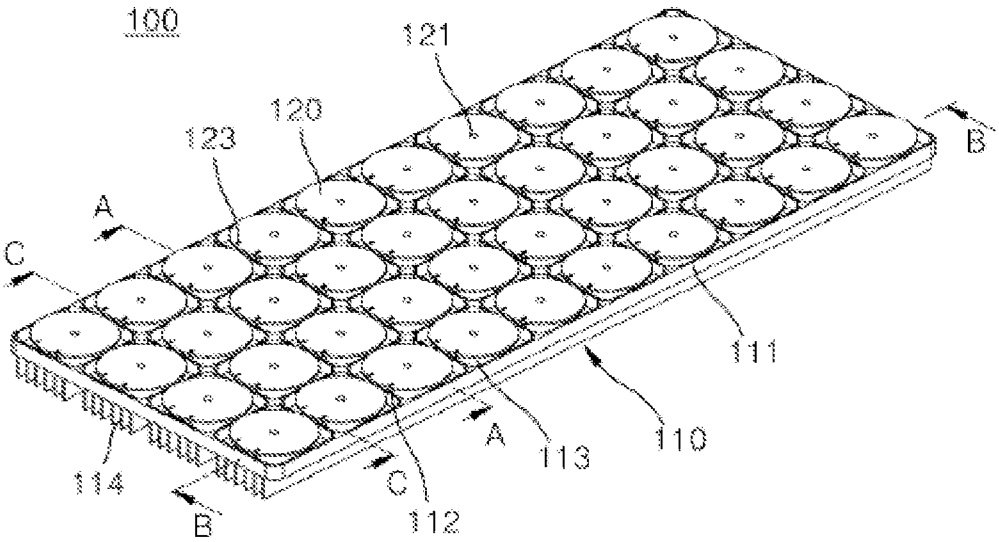
FIG. 1 is a perspective view showing the appearance of an embodiment to which a circular patch plate is applied among components of an antenna assembly according to one embodiment of the present disclosure.

Hereinafter, an antenna assembly and a method of manufacturing the same according to embodiments of the present disclosure will be described in detail with reference to the accompanying drawings.

In adding reference numerals to components in each drawing, it should be noted that the same components have the same reference numerals as much as possible even when they are shown in different drawings. In addition, in describing embodiments of the present disclosure, the detailed description of related known configurations or functions will be omitted when it is determined that the detailed description obscures the understanding of the embodiments of the present disclosure.

The terms, such as first, second, A, B, (a), and (b) may be used to describe components of the embodiments of the present disclosure. The terms are only for the purpose of distinguishing one component from another, and the nature, sequence, order, or the like of the corresponding components is not limited by the terms. In addition, unless otherwise defined, all terms (including technical and scientific terms) used herein have the same meanings as those commonly understood by those skilled in the art to which the present disclosure pertains. The terms defined in a generally used dictionary should be construed as meanings that match with the meanings of the terms from the context of the related technology and are not construed as an ideal or excessively formal meaning unless clearly defined in this application.

Figure 2:
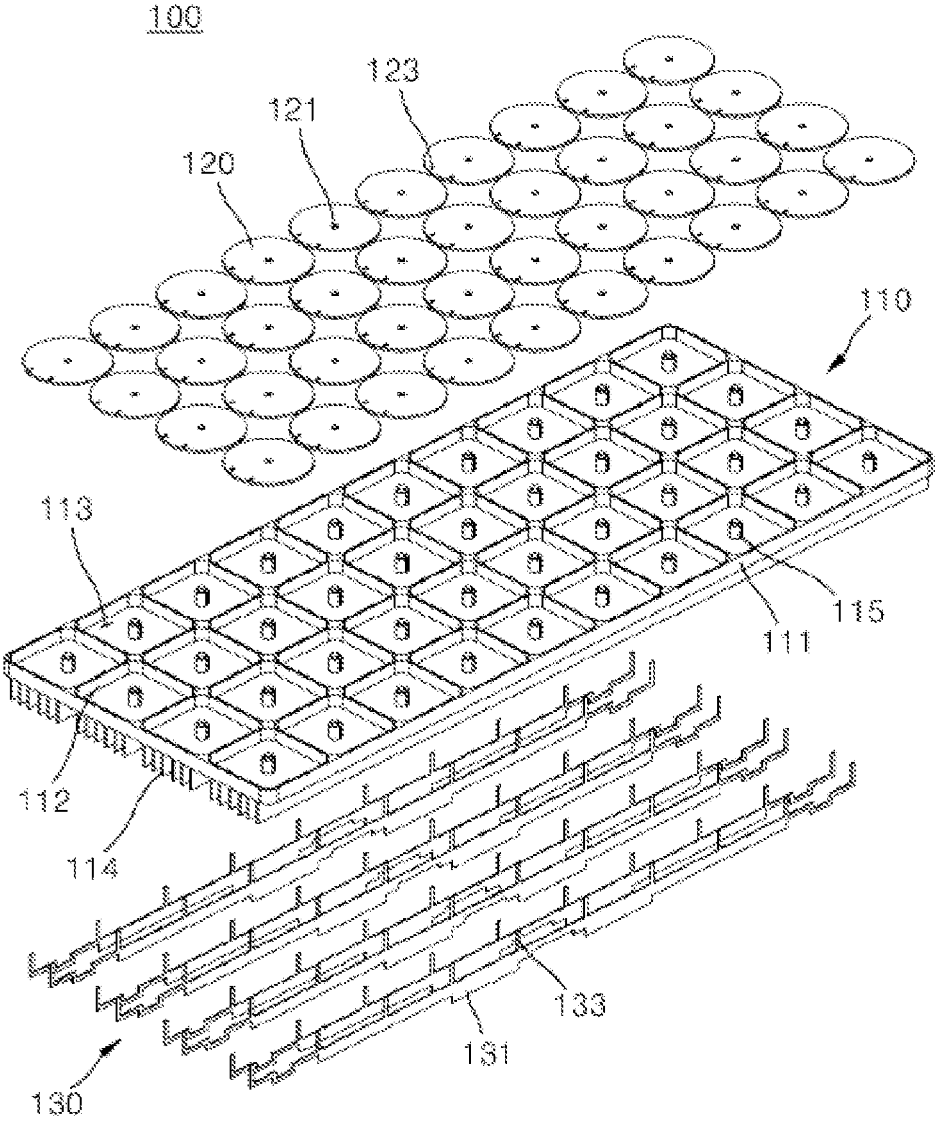
FIG. 2 is an exploded perspective view of FIG. 1.
Figure 3:
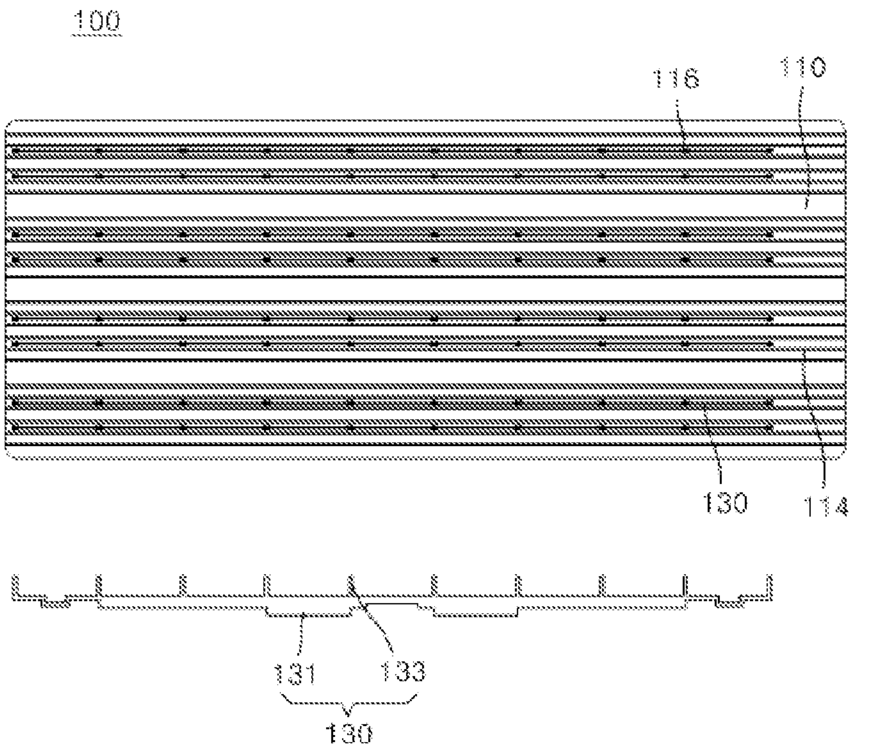
FIG. 3 is a rear view of a base panel and a front view of a signal coupling strip line in a configuration of FIG. 1.

FIG. 1 is a perspective view showing the appearance of an embodiment to which a circular patch plate is applied among components of an antenna assembly according to one embodiment of the present disclosure, FIG. 2 is an exploded perspective view of FIG. 1, and FIG. 3 is a rear view of a base panel and a front view of a signal coupling strip line in a configuration of FIG. 1.

As shown in FIGS. 1 and 2, an antenna assembly 100 according to one embodiment of the present disclosure includes a patch type or dipole type radiation element 120 made of a first material, a plate-shaped base panel 110 made of the same material as the first material or a second material different from the first material, and a plurality of signal coupling strip lines 130 disposed on the other surface of the base panel 110, having a plurality of through terminals 133 spaced apart from each other at intervals at which the array of the radiation elements in a predetermined frequency band is satisfied passing through the base panel 110 and connected to each of the radiation elements 120, and for providing a feeding signal to the radiation element 120.

The radiation element 120 may adopt any one or both of the patch type and the dipole type, and even when the radiation element 120 adopts any one type, it does not mean excluding the adoption of the other.

Hereinafter, for convenience of description, the radiation element 120 is described by being limited to the patch type radiation element 120, and as shown in FIGS. 1 to 7, one embodiment implemented as a patch type of a disk shape among patch types and another embodiment implemented as a patch type of a polygonal shape modified from the patch type of the disk shape as shown in FIGS. 8 to 12 will be separately described.

As shown in FIGS. 1 to 3, the patch type radiation element 120 may be formed in a circular plate shape (hereinafter referred to as "circular type patch plate" and denoted by reference numeral 120). The circular type patch plate 120 may be made of the first material. Here, the first material includes a metal material or plastic having a metal-plated surface and may preferably be an aluminum material. In particular, various methods, such as a press processing and a die-casting processing, may be considered to process the circular type patch plate 120, but a manufacturing method of a die-casting method suitable for a mass-production manufacturing method may be preferably adopted.

Therefore, in the related art, there is a problem that the patch type radiation element 120 is molded into a dielectric board such as plastic or ceramic and then has an outer surface coated by a plating process for the purpose of preventing corrosion and an electrical solder connection with a feeding line, and a metal material is used as a plating material, thereby greatly increasing the cost, but in one embodiment of the present disclosure, since the patch type radiation element 120 may be manufactured by the die-casting method using an aluminum molding material that is the type of the metal material, a separate plating process is not required, while it is possible to greatly simplify a feeding structure by the feeding line to be described below and easily implement dual polarization.

As shown in FIGS. 1 to 3, in the circular type patch plate 120, two feeding connection holes 123 through which tips of the plurality of through terminals 133 in the configuration of at least one signal coupling strip line 130 to be described below are inserted and pass may be formed to be spaced apart by a predetermined distance from each other in a left-right width direction.

Meanwhile, as shown in FIGS. 1 to 3, the base panel 110 is made of a metal material and serves as a reflector on which the patch type radiation element 120 is disposed and at the same time, serves as an electrical ground as a whole together with the patch type radiation element 120.

Specifically, for the feeding to the patch radiation element according to the related art, a method of forming a ground plane on a lower surface of the radiation element formed as a dielectric board such as plastic or ceramic, connecting an internal conductor of a coaxial line to the ground plane through a coaxial feeding structure, and connecting an external conductor to a patch on an upper surface of the radiation element by passing through the dielectric board is used. However, with the above structure, since the ground plane and a patch plane of the patch radiation element are spatially separated, there is a problem in that a feeding structure becomes complicated accordingly, and the patch radiation element needs to be coupled to the reflector through soldering or the like.

On the other hand, according to the present disclosure, both of the patch type radiation element 120 and the base panel 110 are made of the metal material and serve as the ground for the feeding to the radiation element as a whole, and thus it is not necessary to spatially separate the separate ground plane and patch plane, thereby not only greatly facilitating the electrical design for feeding or the like but also simplifying a coupling process between a fixing member 115 to be described below, the radiation element 120, and the base panel 110 through a welding process.

Meanwhile, the base panel 110 may include a panel main body 111 formed in a metal plate shape having a predetermined thickness, at least one cavity wall 112 provided to form integrally with one surface of the panel main body 111 and form a predetermined partitioned space between the radiation elements 120, and the fixing member 115 for separating the radiation element 120 from a bottom surface (i.e., one surface of the panel main body 111) of the partitioned space 113.

Here, as described above, the panel main body 111 may be made of the first metal material or the second metal material, and the at least one cavity wall 112 and the fixing member 115 and a plurality of ground accommodating ribs 114 to be described below may be simply mold-manufactured integrally.

Meanwhile, the partitioned space 113 is a kind of cavity (space) and may be defined as a space that is present between the circular type patch plates 120 spaced apart by a predetermined distance from a bottom surface thereof (i.e., one surface of the panel main body 111).

More specifically, the partitioned space 113 can be understood as the space 113 partitioned through the at least one cavity wall 112 in which an occupied region of each radiation element 120 arranged on one surface side of the panel main body 111 is formed in a quadrangular shape.

Here, a shape formed by the at least one cavity wall 112 may be not only formed in a circular shape corresponding to the appearance of the circular type patch plate 120 but also formed in a rectangular shape or a square shape having a length at least greater than a diameter of the circular type patch plate 120.

As described above, the space 113 partitioned by the at least one cavity wall 112 has a meaning as a space filled with air having a permittivity of 1, except for the fixing member 115 formed at the center thereof and can be understood as a space in which a signal is stabilized because the entry and exit of an external signal are limited by the at least one cavity wall 112 or a signal interference with the adjacent radiation element 120 is minimized.

To this end, a height (i.e., a length protruding from the one surface of the panel main body 111) of the at least one cavity wall 112 is preferably designed to have an optimal value in consideration of the amount of entry and exit of the external signal described above and the amount of signal interference with the adjacent radiation element 120. The optimal value of the height of the cavity wall 112 may be set to be formed to be the same as a separation distance of the radiation element 120 or at least smaller than a separation distance of the radiation element 120.

In the related art, the feeding line (e.g., the feeding cable or the feeding printed circuit board (PCB)) for separating the radiation element 120 from the reflector and at the same time, disposed to cross each other in the X shape in order to supply the feeding signal has been provided at the position corresponding to the partitioned space 113, and there has been a problem in that the structure of the Teflon member having the predetermined permittivity has been additionally installed to reinforce the structure, resulting in a very complicated structure.

In the antenna assembly 100 according to one embodiment of the present disclosure, it is possible to minimize the signal interference with the external signal and the adjacent radiation element 120 by the partitioned space 113 formed by the at least one cavity wall 112 except for the connection portion of the at least one signal coupling strip line 130 and the fixing member 115, which will be described below even without additionally installing a separate reinforcement structure.

As shown in FIGS. 1 and 2, the panel main body 111 of the base panel 110 may be formed to be long in a vertical direction and formed in a rectangular panel shape that is relatively smaller than the vertical length in a left-right direction.

On the one surface of the panel main body 111, the plurality of partitioned spaces 113 of a rectangular parallelepiped shape having a small front and rear thickness (i.e., the height of the cavity wall 112) may be serially disposed in each of the vertical direction and the left-right direction. The number of partitioned spaces 113 formed on one surface of the base panel 110 may be set to be equal to the number of circular type patch plates 120 seated in and fixed to the partitioned space 113.

In this case, the circular type patch plates 120 may be formed to be spaced apart from each other at the interval at which the array of the radiation elements 120 in the predetermined frequency band is satisfied. In general, the interval at which the arrangement of the radiation elements 120 in the predetermined frequency band is satisfied means an electrical separation distance between adjacent circular type patch plates 120, which means about a 1λ distance.

Here, the fixing member 115 may be formed to protrude from the center of each partitioned space 113 and formed to protrude at least in a size that protrudes outward from an opposite surface of the circular type patch plate 120. It is preferable that the fixing member 115 is formed to protrude from the center of a bottom surface (i.e., the one surface of the panel main body 111) formed by each of the partitioned spaces 113. In addition, the fixing member 115 may be formed in a cylindrical shape, and in particular, a tip of the fixing member 115 may be formed to have a relatively smaller diameter and inserted into a fixing member through hole 121 formed at the center of the circular type patch plate 120 to be described below, but the circular type patch plate 120 may be attached to a stepped portion (upper attachment portion) of the fixing member 115 formed to have a relatively greater diameter, and thus the circular type patch plate 120 may be fixed to be spaced apart by a predetermined distance from a bottom surface of the partitioned space 113.

The fixing member through hole 121 through which each of the fixing members 115 is inserted and passes may be formed at the center of the circular type patch plate 120. The fixing member through hole 121 is formed at the center of the circular type patch plate 120 and is preferably set to be positioned at the center of a symmetrical shape of a modified type patch plate 220 even in the modified type patch plate 220 applied to another embodiment, which will be described below.

Meanwhile, a pair of panel through holes 116 through which the plurality of through terminals 133 of the at least one signal coupling strip line 130, which will be described below, are inserted and pass may be formed in the partitioned space 113. Positions at which the pair of panel through holes 116 is formed are preferably designed as positions that minimize the signal interference caused by the plurality of through terminals 133 occupied in the partitioned space 113. More preferably, the pair of panel through holes 116 may be set to be positioned adjacent to the cavity wall 112 in the partitioned space 113 (see FIG. 7 to be described below).

As shown in FIG. 3, at least one signal coupling strip line 130 may include the plurality of through terminals 133 each fixed to the other surface of the panel main body 111 of the base panel 110 and formed to be branched toward the circular type patch plate 120 positioned on one surface of the panel main body 111. A specific feeding structure for the corresponding radiation element 120 of the signal coupling strip line 130 will be described in more detail below.

As shown in FIGS. 1 to 3, on the other surface of the panel main body 111 of the base panel 110, a plurality of ground accommodating ribs 114 for accommodating partitioned signal coupling strip lines, respectively, after partitioning the at least one signal coupling strip line 130 may be formed integrally with the panel main body 111.

For example, a pair of two signal coupling strip lines 130 is preferably formed on a single radiation element 120 when the radiation element 120 disposed on one surface of the panel main body 111 is provided as a dual polarization patch element for generating dual polarization, such as ±45° polarization or vertical/horizontal polarization. In other words, as shown in FIGS. 1 to 3, when four radiation elements 120 are disposed to be spaced apart from each other in a width direction of the panel main body 111, eight signal coupling strip lines 130 may be provided.

Here, the number of plurality of ground accommodating ribs 114 formed on the other surface of the panel main body 111 may be formed as a number in which all of the signal coupling strip lines 130 are each accommodated when the eight signal coupling strip lines 130 are provided.

In addition, as shown in FIGS. 1 to 3, when ten radiation elements 120 are disposed to be spaced apart from each other in a longitudinal direction of the panel main body 111, ten through terminals 133 formed on each of the at least one signal coupling strip line 130 may be provided and at the same time, provided in a linear shape to simultaneously and serially supply the feeding signal to any one of the feeding points provided on each of the ten radiation elements 120.

In general, when a band width of a frequency is large, such as 400 to 500 MHz or more, it is known that a parallel supply method is more advantageous than a serial supply method as a supply method of a feeding signal. This is because the serial supply method may have a variable phase (slope) at a frequency far from a center frequency, resulting in phase deviation. For example, when a bandwidth is 400 MHz and the serial supply method is adopted as the supply method of the feeding signal, a phase near the center frequency does not change, but a phase delay of about −6° may occur at the frequency farthest from the center, thereby reducing a gain. However, the parallel supply method of the feeding signal requires more lines than the serial supply method, while loss increases and gain decreases as much as the added lines, and thus a complicated line design is required to minimize the loss.

For example, in the case of 3.5 GHz and 28 GHz, which are recently used as 5G frequencies, a 300 MHz width is used in the 3.5 GHz band and a 1 GHz width is used in the 28 GHz band, and assuming that these bandwidths are divided and used by three service providers, a bandwidth of about 100 MHz may be allocated for the 3.5 GHz band and a bandwidth of about 333 MHz may be allocated for the 28 GHz band.

In the embodiment of the present disclosure, since the serial supply method of the feeding signal may be used in an environment in which the bandwidth is smaller than 300 MHz, there is an advantage in that it is possible to solve both of the loss problem in the parallel supply method and the complicated line design, which have been described above.

To this end, it is preferable that the at least one signal coupling strip line 130 is also provided in a linear shape so that the feeding signal may be simultaneously supplied to each of the radiation elements 120 disposed side by side (linear shape) on one surface of the panel main body 111 in the serial supply method.

Figure 4:
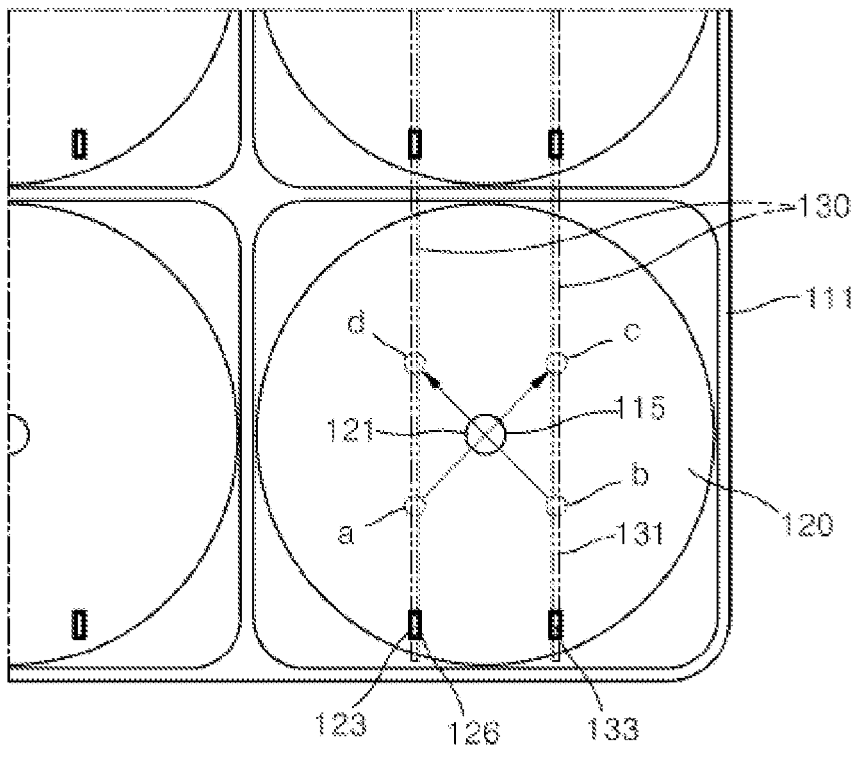
FIG. 4 is a schematic view for describing a feeding state of a feeding signal to a radiation element using the signal coupling strip line and the implementation of dual polarization.

FIG. 4 is a schematic view for describing a feeding state of a feeding signal to a radiation element using the signal coupling strip line and the implementation of dual polarization.

The through terminal 133 formed on each of the signal coupling strip line 130 supplies the feeding signal to a pair of feeding points a and b provided on the radiation element 120. For example, when the radiation element 120 is the dual polarization patch element for generating ±45° polarization, the feeding signals corresponding to +45° and −45° polarization are supplied to the feeding points a and b, respectively.

Here, when the polarized feeding signal is supplied to the radiation element 120, the resonance of the radiation element 120 is generated as the signal flows along an edge rather than a central portion of the radiation element 120 due to the characteristics of the signal in the high frequency band. At this time, even when different polarized signals overlap each other, the two polarized signals do not affect each other because directions of vectors are orthogonal to each other. For example, referring to FIG. 4, a transmission signal at a feed point c positioned diagonally from the feed point a may be phase delayed 180°, and likewise, a transmission signal at a feed point d positioned diagonally from the feed point b may also be phase delayed 180°. Therefore, the dual polarization orthogonal to each other is generated at the feed points a and c and the feed points b and d of the radiation element 120.

Meanwhile, as described above, the base panel 110 may serve as the ground for the feeding to the radiation element 120 as a whole because the panel main body 111 and the cavity wall 112 are made of a metal material. Here, when the through terminal 133 of the signal coupling strip line 130 is electrically conducted directly to the base panel 110, there is a concern on an electrical short-circuit phenomenon, and thus an insulating tip 126 for insulating between an inner circumferential end of the panel through hole 116 to be described below and the through terminal 133 may be provided. The through terminal 133 of the signal coupling strip line 130 may pass through the insulating tip 126 and may be exposed toward the space 113 of the base panel 110.

A serial supply state of a specific feeding signal using the signal coupling strip line 130 will be described in more detail with reference to FIG. 13 to be described below.

Meanwhile, the base panel 110 including the above configuration may be made of a first material (i.e., an aluminum material), which is the same material as the circular patch plate 120, or a second material different from the first material. Here, the second material may include a magnesium material other than the aluminum material that is the first material. Therefore, the base panel 110 may be made of any one of the aluminum material and the magnesium material. Like the radiation element 120, the base panel 110 may be mold-manufactured by the die-casting method.

Here, as described above, the base panel 110 is made of any one of the first material and the second material, which are the metal materials, and also serves as a reflector for reflecting the frequency signal emitted from the radiation element 120.

Figure 5:
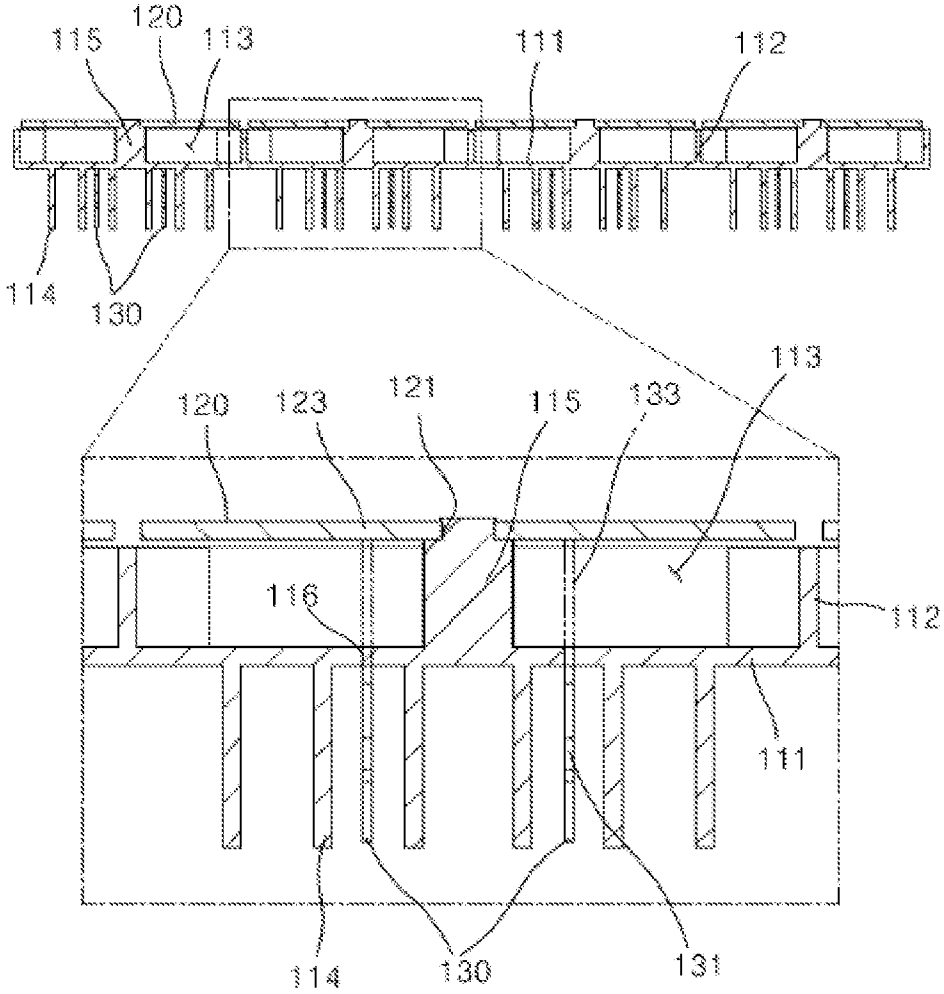
FIG. 5 is a cross-sectional view along line A-A in FIG. 1 and a partially enlarged view thereof.
Figure 6:
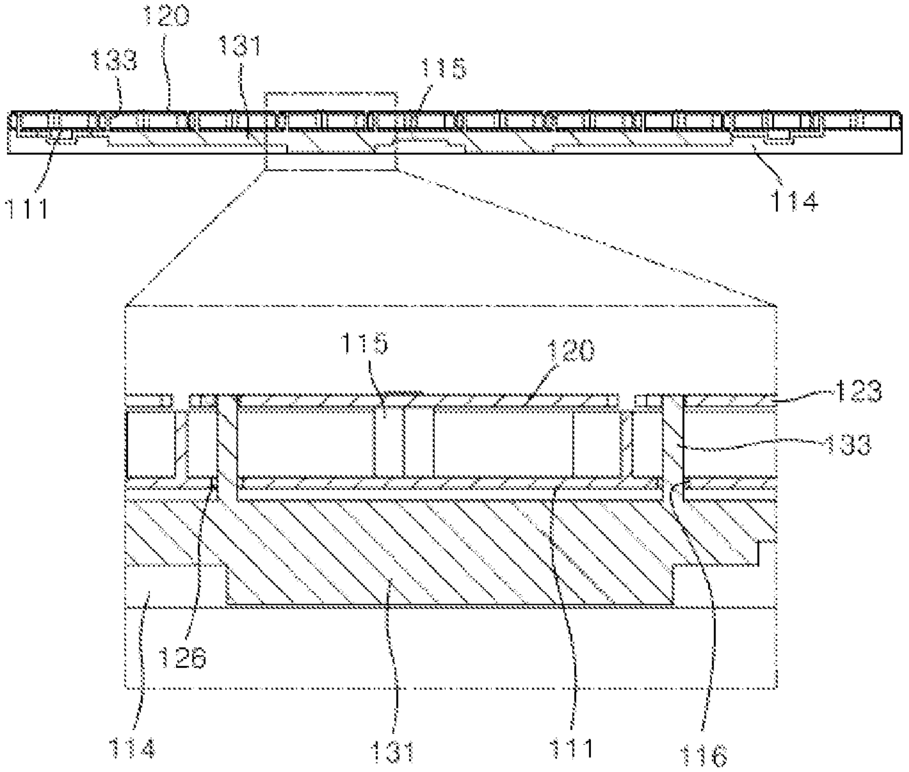
FIG. 6 is a cross-sectional view along line B-B in FIG. 1 and a partially enlarged view thereof.
Figure 7:
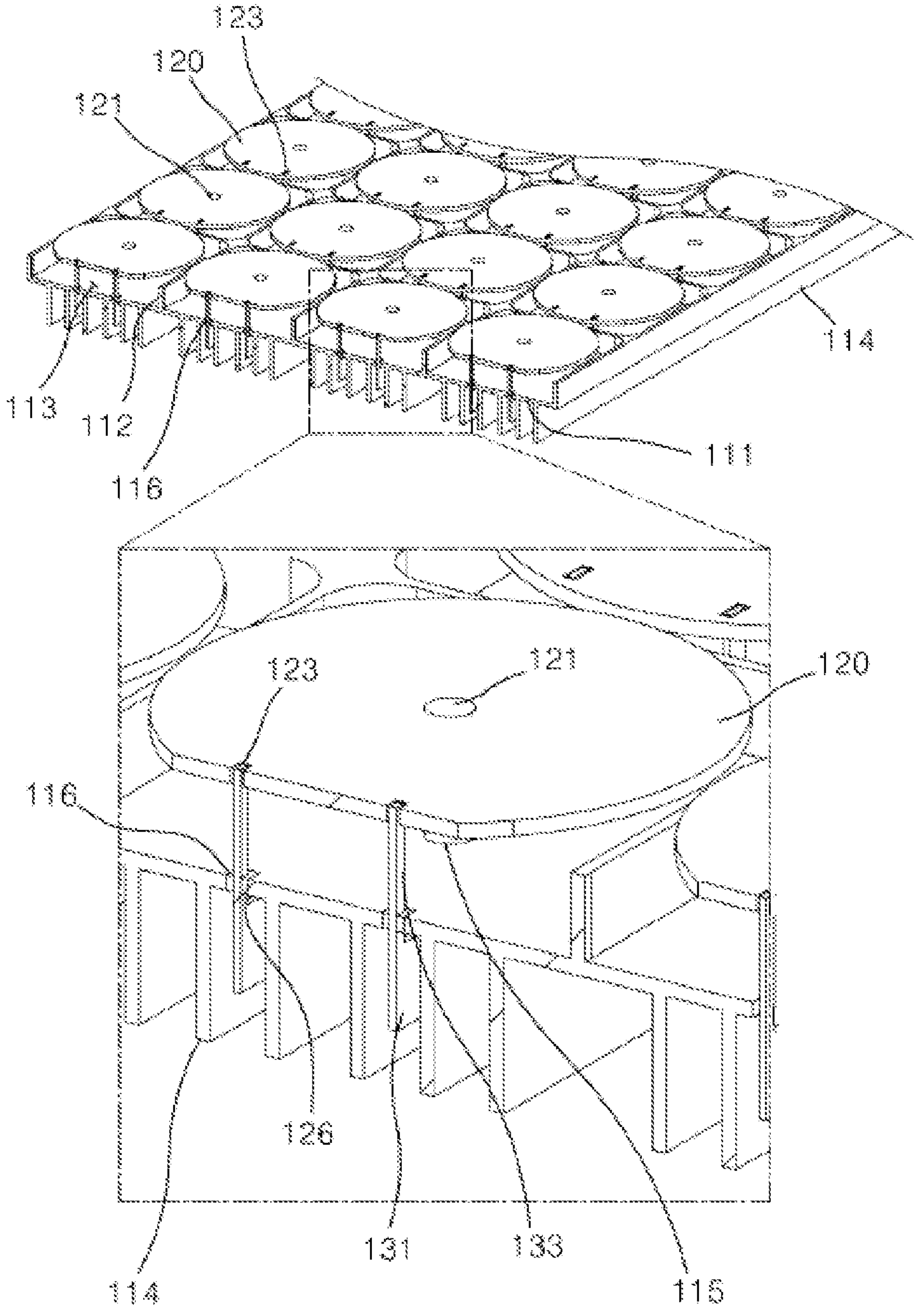
FIG. 7 is a cutout perspective view along line C-C in FIG. 1 and a partially enlarged view thereof.

FIG. 5 is a cross-sectional view along line A-A in FIG. 1 and a partially enlarged view thereof, FIG. 6 is a cross-sectional view along line B-B in FIG. 1 and a partially enlarged view thereof, and FIG. 7 is a cutout perspective view along line C-C in FIG. 1 and a partially enlarged view thereof.

As shown in FIGS. 5 to 7, the antenna assembly 100 according to one embodiment of the present disclosure configured as described above may be automatically assembled through the automated assembly process.

More specifically, a method of manufacturing the antenna assembly according to one embodiment of the present disclosure includes a radiation element manufacturing operation of mold-manufacturing the radiation element in the die-casting method or the press method using the molding material of the first metal material, a base panel manufacturing operation of mold-manufacturing the base panel in the die-casting method or the press method using the molding material of a material that is the same as the first metal material or different from the first metal material, and a fixing operation of coupling the signal coupling strip line provided to pass through the base panel and the radiation element for the base panel in a laser point welding method using a laser welding device.

In particular, the fixing operation includes a process of not only serving as the ground as a whole but also fixing the base panel 110 on which the space 113 partitioned by at least one cavity wall 112 is formed when mold-manufactured in the die-casting method to a position of a fixing unit of an automated assembly device (not shown).

Next, the fixing operation may include a process of moving the plurality of signal coupling strip lines 130 between the ground accommodating ribs 114 corresponding to each of the signal coupling strip lines 130 on the other surface of the panel main body 111 and fixing the plurality of through terminals 133 branched and extending from a strip line main body 131 of the signal coupling strip line 130 through the panel through hole 116 using the automated assembly device. In this case, the insulating tip 126 may be provided between the panel through hole 116 and the through terminal 133 of the signal coupling strip line 130 so as to be insulated therebetween and thus the through terminal 133 may be fixed through the panel through hole 116.

In addition, the fixing operation may further include a process of simultaneously moving the circular type patch plates 120 toward one surface of the panel main body 111 and temporarily assembling the fixing member 115 so that each of tip portions of the fixing member 115 is seated to pass through each of the fixing member through holes 121 formed in each of the circular type patch plates 120 using a clamping unit (not shown) of the automated assembly device.

Finally, the fixing operation may further include a process of radiating a laser to and point-welding the through terminal 133 of the signal coupling strip line 130 exposed toward the one surface of the panel main body 111 through the feeding connection hole 123 formed in the circular type patch plate 120 and the tip portion of the fixing member 115 exposed through the fixing member through hole 121 formed in the circular type patch plate 120 using the laser welding device (not shown).

As described above, the antenna assembly 100 according to one embodiment of the present disclosure has an advantage in that as the base panel 110 is manufactured in the die-casting method using the molding material of the metal material and the radiation elements 120 coupled to the base panel 110 is also manufactured in the die-casting method using the molding material of the metal material, the process of applying the separate solder cream for fixing the two components is not required, and the base panel 110 and the radiation element 120 may be fixed very simply using the laser welding device.

For reference, as in another embodiment to be described with reference to FIGS. 8 to 12, when a pair of extension connection legs 225 extending a predetermined length from one surface of the radiation element 220 is provided, the radiation element manufacturing operation is preferably implemented so that a laser transmission cutout portion 227 is formed in order to perform the above-described fixing operation.

Figure 8:
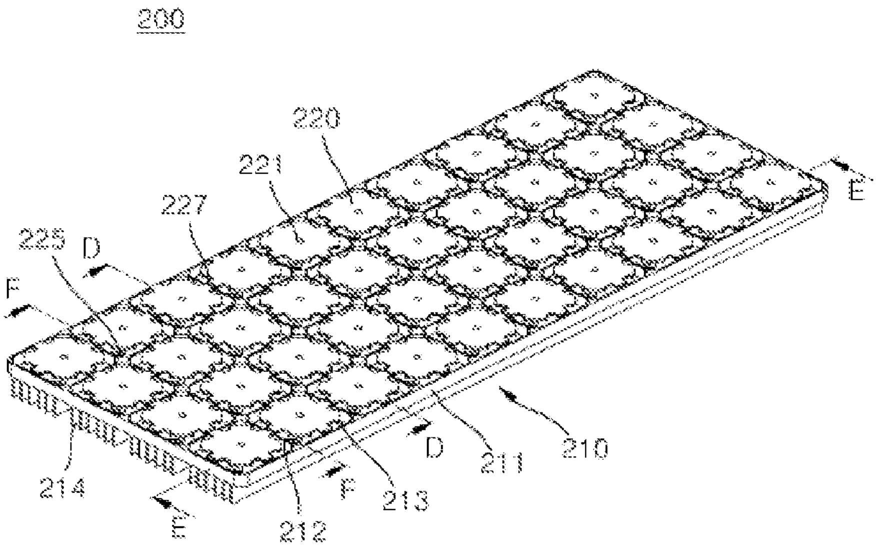
FIG. 8 is a perspective view showing the appearance of an embodiment to which a modified patch plate is applied among components of an antenna assembly according to another embodiment of the present disclosure.
Figure 9:
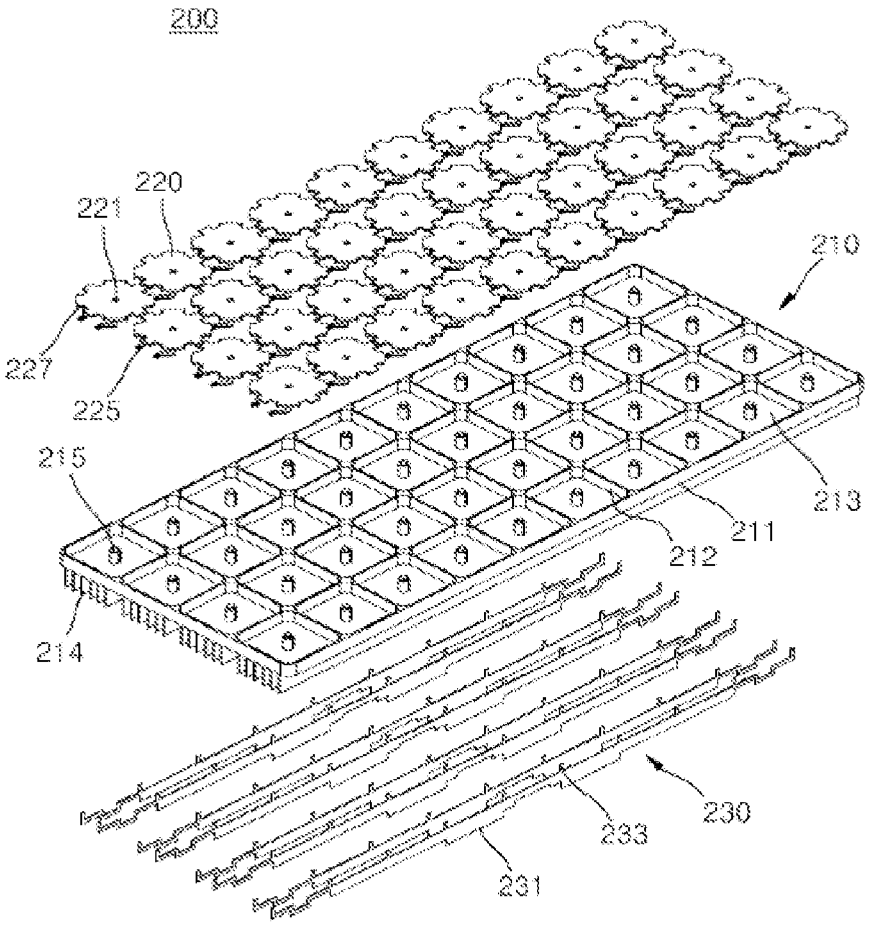
FIG. 9 is an exploded perspective view of FIG. 8.
Figure 10:
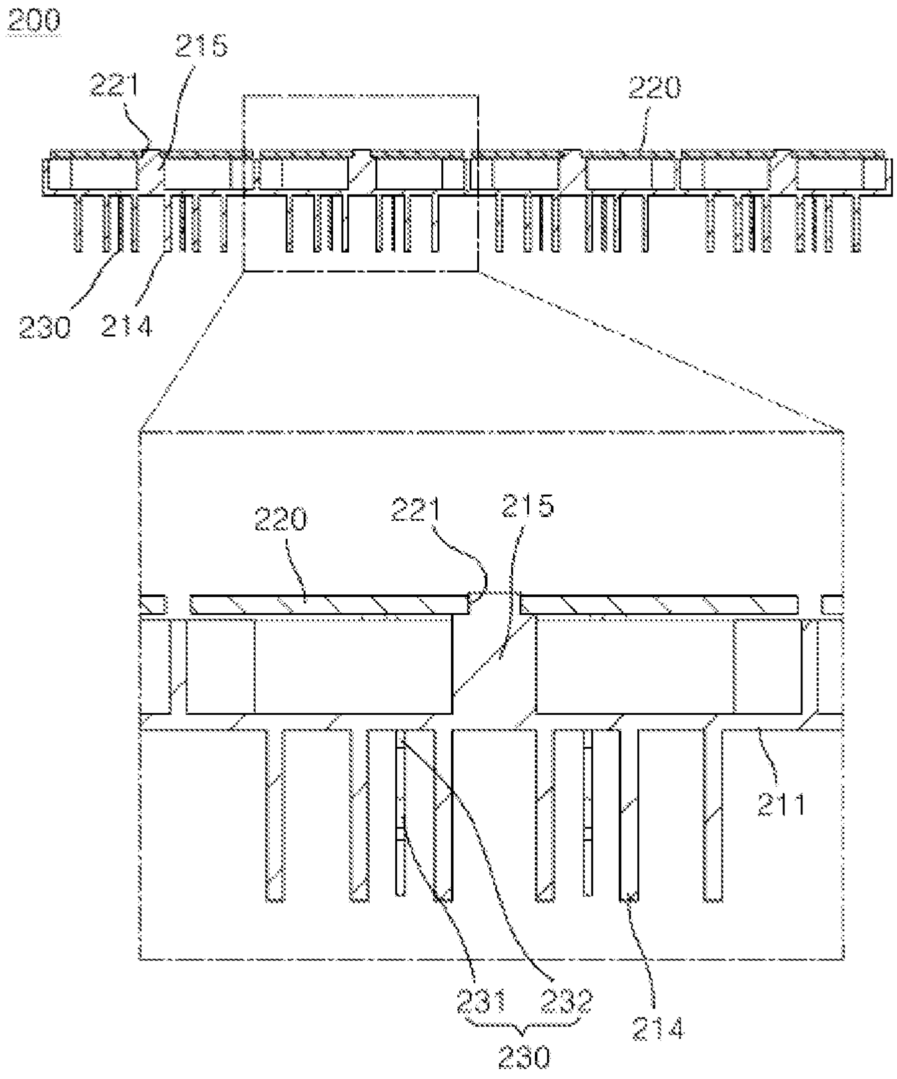
FIG. 10 is a cross-sectional view along line D-D in FIG. 8 and a partially enlarged view thereof.
Figure 11:
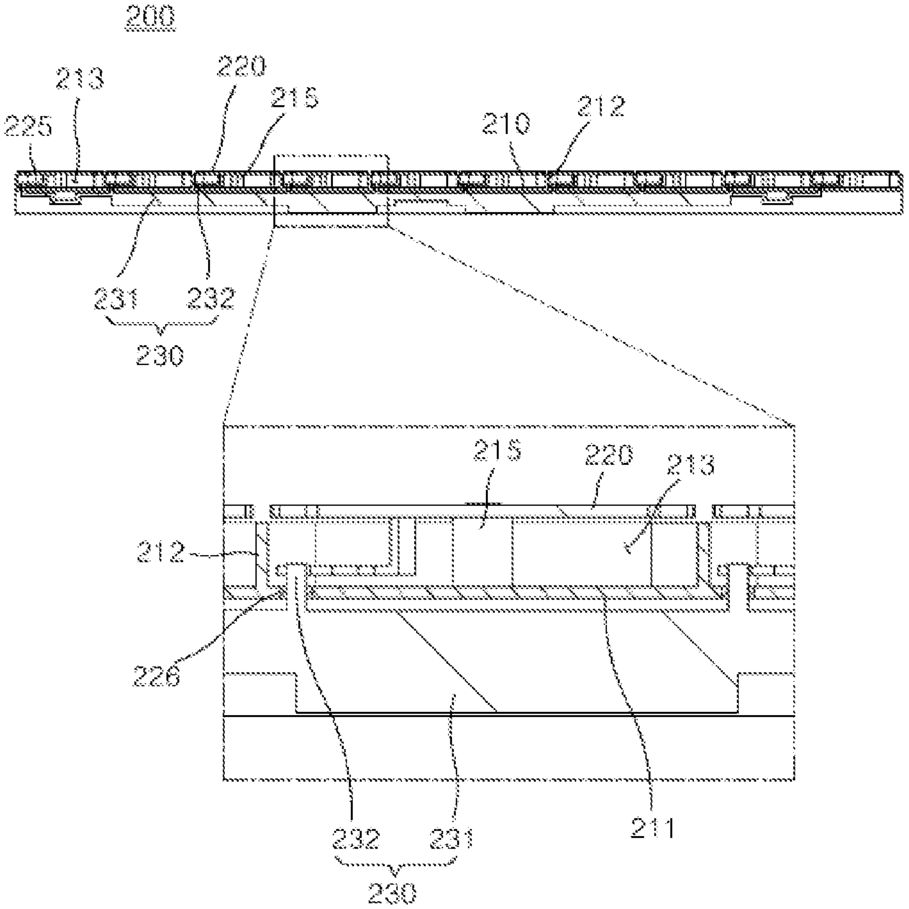
FIG. 11 is a cross-sectional view along line E-E in FIG. 8 and a partially enlarged view thereof.
Figure 12:
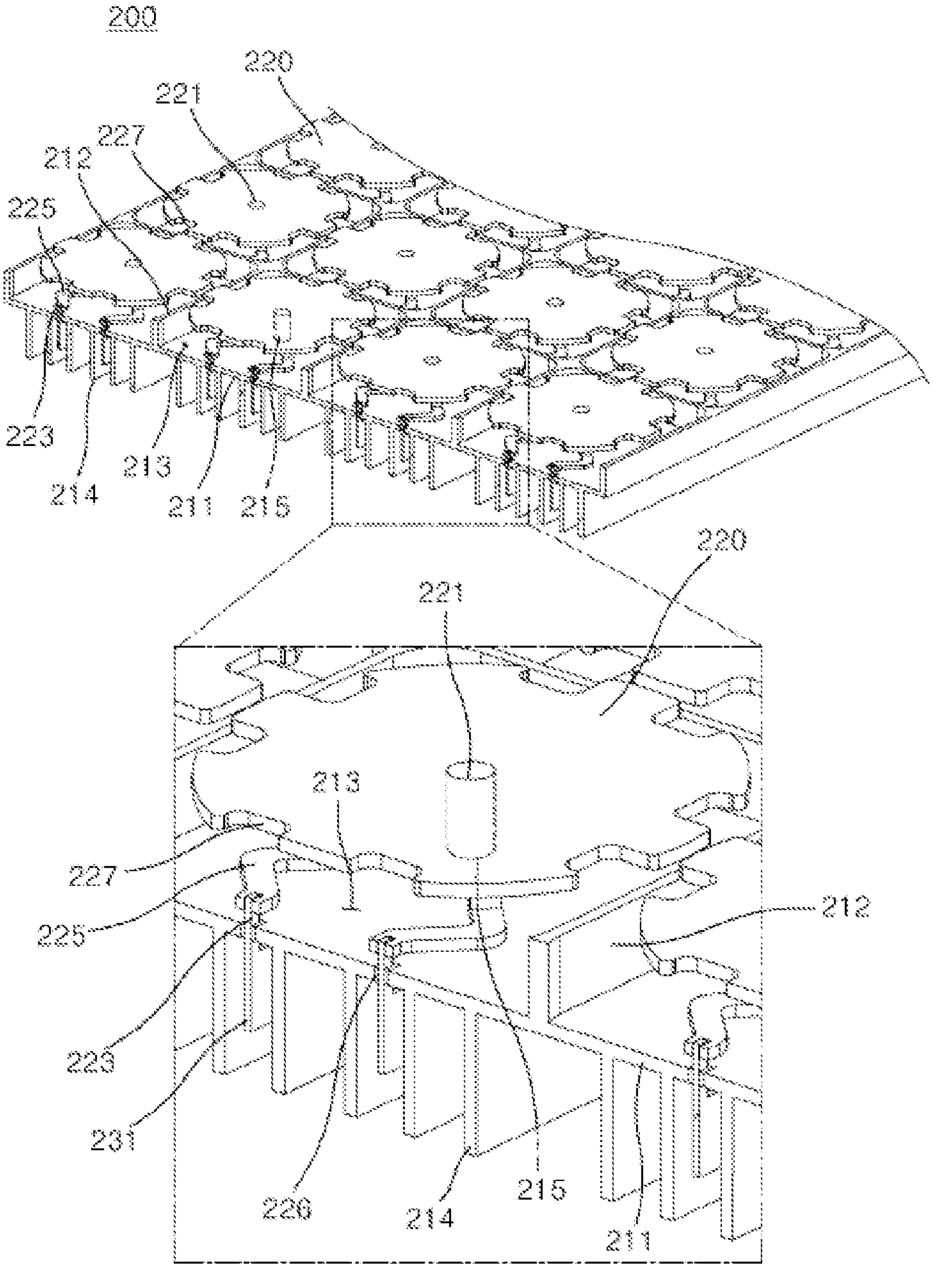
FIG. 12 is a cutout perspective view along line F-F in FIG. 8 and a partially enlarged view thereof.

FIG. 8 is a perspective view showing the appearance of an embodiment to which a modified patch plate is applied among components of an antenna assembly according to another embodiment of the present disclosure, FIG. 9 is an exploded perspective view of FIG. 8, FIG. 10 is a cross-sectional view along line D-D in FIG. 8 and a partially enlarged view thereof, FIG. 11 is a cross-sectional view along line E-E in FIG. 8 and a partially enlarged view thereof, and FIG. 12 is a cutout perspective view along line F-F in FIG. 8 and a partially enlarged view thereof.

As compared to the antenna assembly 100 according to one embodiment of the present disclosure described above with reference to FIGS. 1 to 7, an antenna assembly 200 according to another embodiment of the present disclosure is an embodiment in which the shape of the radiation element 120 is modified from the circular type patch plate 120 to a shape of a modified type patch plate 220. The change in the shape of the radiation element (120->220) results in a change in a welding position in the laser point welding process to be described below.

Hereinafter, as compared to the above-described antenna assembly 100 according to one embodiment of the present disclosure, a detailed description of the common configuration and the function thereof will be omitted, and a description will focus on configurations related to relatively different or changed portions.

As shown in FIGS. 8 to 12, the antenna assembly 200 according to another embodiment of the present disclosure is configured so that a plurality of through terminals 233 formed from a strip line main body 231 of a signal coupling strip line 230 are connected to a plurality of extension connection legs 225 formed to extend from the modified type patch plate 220 toward a bottom surface (i.e., one surface of a panel main body 211) of the base panel 210.

As in the antenna assembly 100 according to one embodiment of the present disclosure, it is preferable that the plurality of through terminals 133 pass through the partitioned space 113 formed in the one surface of the panel main body 111 and are directly connected to the feeding connection holes 123 formed in the radiation element 120, but in this case, a certain portion may be limited in designing dual polarization.

Therefore, in the antenna assembly 200 according to another embodiment of the present disclosure, the pair of extension connection legs 225 extending from an opposite surface of the radiation element 220, which is a surface facing the one surface of the panel main body 211, may be additionally provided. The feeding connection hole 223 that is the same as the feeding connection hole 123 of the above-described embodiment may be formed on ends of the pair of extension connection legs 225.

As compared to the antenna assembly 100 according to one embodiment of the present disclosure, since the pair of extension connection legs 225 change connection portions with the plurality of through terminals 233 to be close to the one surface of the panel main body 211, the pair of extension connection legs 225 may have the ends formed to be bent from and extend toward the side in which the panel through hole 216 is formed and may be provided to be formed to extend downward up to a position adjacent to one surface of the space 213 of the base panel 210 Therefore, it is sufficient that lengths of the plurality of extension connection legs 225 formed on the strip line main body 231 of the signal coupling strip line 230 are formed to be lengths into which the plurality of extension connection legs 223 pass through the panel through holes 216 of the panel main body 211 and are inserted into each of the feeding connection holes 223 of the pair of extension connection legs 225 positioned adjacent thereto.

In addition, it is preferable that the pair of extension connection legs 225 extends to have a length at which an end in which the feeding connection hole 223 is formed is positioned just under the laser transmission cutout portion 227 formed on the modified type patch plate 220 to be described below.

In addition, the modified type patch plate 220 may further include the laser transmission cutout portion 227 having a partially cutout portion so that the laser irradiated from the laser welding device positioned outside the one surface of the panel main body 211 may be projected between the opposite surface of the radiation element 220 and the one surface of the panel main body 211 without interference.

Here, it is preferable that a portion symmetrical to the cutout portion with respect to the center of the radiation element 220 is additionally formed to be cut in that the appearance needs to be symmetrical due to the characteristics of the radiation element 220 when the portion is cut as the laser transmission cutout portion 227.

Figure 13:
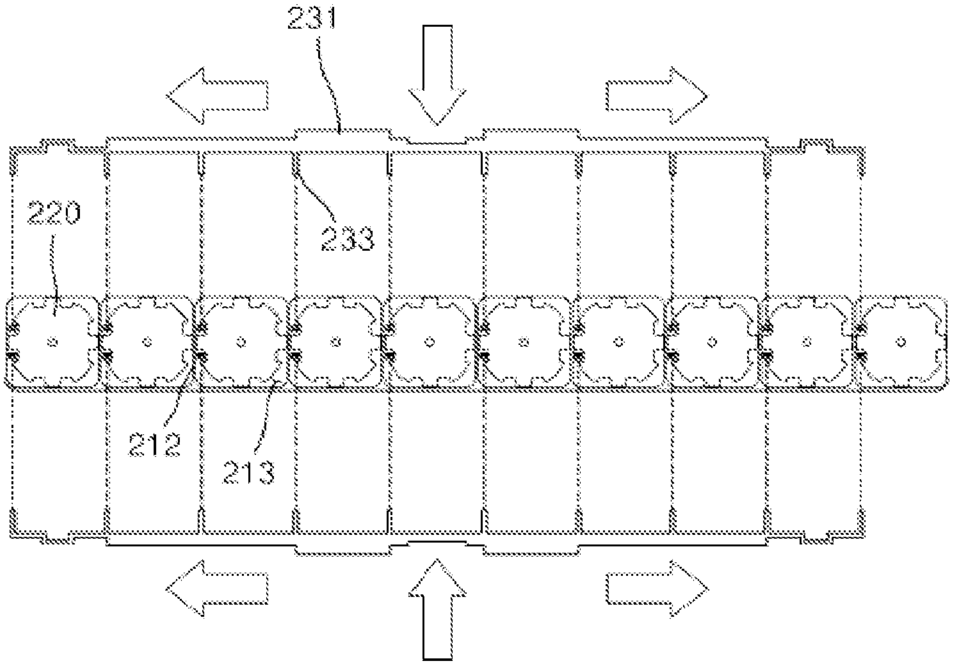
FIG. 13 is a conceptual diagram for describing a feeding process of the antenna assemblies according to the embodiments of the present disclosure.

FIG. 13 is a conceptual diagram for describing a feeding process of the antenna assemblies according to the embodiments of the present disclosure.

The feeding process of the antenna assemblies 100 and 200 according to the embodiments of the present disclosure configured as described above will be briefly described with reference to the drawing (in particular, see FIG. 13).

As shown in FIG. 13, after a preset dual polarization feeding signal is supplied to the center point of the array of the radiation element through the center of the pair of signal coupling strip lines 230 and then distributed in parallel, that is, branched to both sides through the center of the strip line main body 231 of the signal coupling strip line 230, the feeding signal is simultaneously supplied to the feeding points of each of the radiation elements 220 through the branched and extending through terminals 233.

The radiation elements 220 disposed on the one surface of the panel main body 211 are spaced apart by 1λ, which is an electrical distance, from each other, and when the feeding signal is supplied through an end side other than the center of the strip line main body 231, there is a problem that the phase is delayed by the separated electrical distance. Therefore, in the present disclosure, there is an advantage in that it is possible to prevent the phenomenon in which the phase is delayed by the electrical distance by initially supplying the feeding signal symmetrically to both sides through the center of the strip line main body 231.

The antenna assembly and the method of manufacturing the same according to the embodiments of the present disclosure have been described above in detail with reference to the accompanying drawings. However, it goes without saying that the embodiments of the present disclosure are not necessarily limited by the above-described embodiments, and various modifications and implementation within the equivalent scope are possible by those skilled in the art to which the present disclosure pertains. Therefore, the true scope of the present disclosure will be determined by the appended claims.

INDUSTRIAL APPLICABILITY

The present disclosure provides the antenna assembly and the method of manufacturing the same in which the radiation element and the base panel may be made of the first material or the second material through the die-casting mold or the press mold and then assembled with the signal coupling strip line in the laser point welding method without the separate plating process.

The invention claimed is:

1. An antenna assembly comprising:

at least one radiation element made of a first metal material;

a base panel made of the first metal material or a second metal material different from the first metal material and including a fixing member configured to separate the radiation element from one surface thereof; and at least one signal coupling strip line disposed on the other surface of the base panel and connected to the radiation element by passing through the base panel to provide a feeding signal to the radiation element, wherein the signal coupling strip line includes:

a strip line main body formed in a linear shape to correspond to a straight line which is connected to a feeding point of the at least one radiation element; and a through terminal extending from the strip line main body and vertically penetrating the fixing member to be connected to the feeding point of the at least one radiation element.

2. The antenna assembly of claim 1, wherein the radiation element and the base panel contain an electrical ground for the feeding to the radiation element.

3. The antenna assembly of claim 1, wherein the base panel further includes at least one cavity wall formed to minimize signal interference between adjacent radiation elements.

4. The antenna assembly of claim 1, wherein each of the radiation element and the base panel is manufactured by a die-casting mold or a press mold.

5. The antenna assembly of claim 1, wherein the first material of the radiation element includes a metal material or plastic having a metal-plated surface.

6. The antenna assembly of claim 1, wherein the second metal material of the base panel includes aluminum or magnesium.

7. The antenna assembly of claim 1, wherein the radiation element is formed in a disk or polygonal shape.

8. The antenna assembly of claim 1, wherein the signal coupling strip line includes:

a plurality of through terminals, including the through terminal, branched and extending from the strip line main body and connected to one of feeding points of radiation elements including the feeding point of the radiation element.

9. The antenna assembly of claim 8, wherein the plurality of through terminals are connected by passing through the radiation element or connected to a plurality of extension connection legs formed to extend from the radiation element toward a bottom surface of the base panel.

10. The antenna assembly of claim 9, wherein the radiation element is provided with a laser transmission cutout portion in which a portion of an edge is formed to be cut for the laser point welding connection with the plurality of through terminals through the plurality of extension connection legs.

11. The antenna assembly of claim 10, wherein feeding connection holes into which the plurality of through terminals are inserted are formed by passing through ends of the plurality of extension connection legs, and the plurality of extension connection legs extend so that the ends in which the feeding connection holes are formed are positioned just under the laser transmission cutout portion.

12. The antenna assembly of claim 3, wherein the fixing member is formed to protrude from a center of a bottom surface on which the cavity wall is each formed, and each of fixing member through holes through which an upper attached portion of the fixing member to which the radiation element is attached passes is formed in the radiation element.

13. The antenna assembly of claim 1, wherein the radiation element and the signal coupling strip line, and the radiation element and the fixing member are connected by a laser point welding coupling method.

14. The antenna assembly of claim 1, wherein the radiation element is provided as a dual polarization patch element for generating any one dual polarization of +45° polarization or vertical/horizontal polarization, and the signal coupling strip line is provided in a linear shape that is simultaneously connected to any one of feeding points of the radiation element disposed side by side.

15. The antenna assembly of claim 14, wherein the feeding signal is simultaneously supplied through a pair of signal coupling strip lines disposed adjacent to each other among the signal coupling strip lines, and the feeding signal is supplied to a center point of an array of the radiation element disposed side by side and then branched in parallel, and each of the branched feeding signals is supplied serially in a one side linear direction and the other side linear direction.

16. The antenna assembly of claim 1, wherein the other surface of the base panel is formed integrally with a plurality of ground accommodating ribs for accommodating partitioned signal coupling strip lines, respectively, after partitioning the plurality of signal coupling strip lines.

* * * * *